US006908156B1

(12) United States Patent
Park et al.

(10) Patent No.: US 6,908,156 B1
(45) Date of Patent: Jun. 21, 2005

(54) ROUND RECLINER FOR VEHICLE

(75) Inventors: Myung Won Park, Seoul (KR); Seong Tae Kim, Cheonan-Si (KR)

(73) Assignee: Yoon Young Co., Ltd., Cheonan-Si (KR)

( * ) Notice: Subject to any disclaimer, the term of this patent is extended or adjusted under 35 U.S.C. 154(b) by 0 days.

(21) Appl. No.: 10/735,034

(22) Filed: Dec. 12, 2003

(30) Foreign Application Priority Data

Feb. 18, 2003 (KR) ...................... 10-2003-0010060

(51) Int. Cl.[7] ................................................ B60N 2/02
(52) U.S. Cl. ...................................... 297/366; 297/367
(58) Field of Search ................................ 297/366, 367

(56) References Cited

U.S. PATENT DOCUMENTS 6,019,430 A 2/2000 Magyar et al.
6,312,053 B1 * 11/2001 Magyar ...................... 297/367
6,626,495 B2 * 9/2003 Okazaki et al. ............. 297/367
6,669,297 B2 * 12/2003 Cilliere et al. .............. 297/367

* cited by examiner

*Primary Examiner*—Anthony D. Barfield
(74) *Attorney, Agent, or Firm*—Schmeiser, Olsen & Watts

(57) ABSTRACT

A round recliner for a vehicle having three lock gears evenly spaced apart from each other. Each of the lock gears are interposed between a cam and a corresponding lock gear supporting member in such a manner that the lock gears are engaged with a circular inner gear part of a sector gear, wherein the lock gears are turned along the lock gear supporting members so that an outer gear part of each of the lock gears is disengaged from the inner gear part of the sector gear or the outer gear part of each of the lock gears is engaged with the inner gear part of the sector gear, thereby minimizing occurrence of clearances in the recliner and preventing any irregular engagement of the recliner.

7 Claims, 11 Drawing Sheets

800
100
220
210
200
240
330
311
331
332
300

ROUND RECLINER FOR VEHICLE

BACKGROUND OF THE INVENTION

1. Field of the Invention

The present invention relates to a recliner mounted in a seat of a vehicle for controlling an angle of inclination of the back of the seat, and more particularly to a round recliner for a vehicle that is capable of minimizing occurrence of clearances in the recliner and preventing any irregular engagement of the recliner.

2. Description of the Related Art

As well known to those skilled in the art, one or more seats are provided in a vehicle, on which a driver or a passenger sits comfortably. In the seat are mounted a pair of seat fixing bases actuated by means of a lever for moving a seat back and forth, and a recliner mounted to the rear end of one of the seat fixing bases for rotating the back of the seat back and forth. The recliner is used for the driver or the passenger to adjust a rotational position of the back of the seat based on his/her body form.

The aforesaid recliner is usually mounted to one side of the seat fixing base to which an actuating lever is attached. When the vehicle collides with another vehicle or any structure, the back of the seat leans forward. At this time, the back of the seat attached to the seat fixing base where the recliner is not provided leans forward, whereas the back of the seat attached to the seat fixing base where the recliner is provided does not lean forward. As a result, a rotational force is generated about the recliner, and thus a repulsive force and the rotational force are applied to the back of the seat when the driver or the passenger is pushed forwardly.

A recliner as shown in FIG. 8 has been proposed in order to solve the aforesaid problems. As shown in FIG. 8, lower fixing members 2 are attached to the rear ends of seat fixing bases 1, respectively. To the lower fixing members 2 are pivotably attached upper fixing members 4 for controlling a rotating movement of the back of the seat. The recliner comprises a first recliner part having a lower gear 12 rotated by means of a rotational movement of a cam 13 effected by an actuating lever 10 for controlling a rotating movement of the back of the seat, and a second recliner part connected to the first recliner part via a shaft 14. The second recliner part has a link 15, by which the second recliner part can be cooperated with the first recliner part. At one of the seat fixing bases 1 is provided a nut hole 16, which is close to the lower fixing member 2. A safety belt 17 is fixed to the seat fixing base 1 by means of the nut hole 16.

As described above, the recliner is very complicated in its structure, with the result that the assembly of the recliner is difficult and the cost of manufacturing the recliner is increased. Furthermore, the nut hole provided for fixing the safety belt is formed at the front part of the seat fixing base due to the structure of the lower fixing member. Consequently, the safety belt does not function effectively when the vehicle collides with another vehicle or any structure.

Therefore, a recliner as shown in FIGS. 9 and 10 has been proposed in order to solve the aforesaid problems. As shown in FIGS. 9 and 10, the recliner comprises: a lock gear guiding groove 32 formed inside an upper actuating member 30 by means of blanking, in which a lock gear 50 is operatively arranged; an inner gear part 34 formed on the lower inner edge of the lock gear guiding groove 32 by means of the aforesaid blanking, the lock gear 50 being engaged with the inner gear part 34; a lock gear actuating groove 42 formed inside a lower supporting member 40 by means of the aforesaid blanking; an inner gear part 45 formed on the lower inner edge of the lock gear actuating groove 42 by means of the aforesaid blanking; a reinforcing portion 44 protruded from the lower supporting member 40, the reinforcing portions 44 being inserted into the lock gear guiding groove 32 of the upper actuating member 30, the lock gear 50 being actuated vertically by means of an actuating cam 60 in the lock gear actuating groove 42 of the lower supporting member 40; and a cam hole 54 formed in the lock gear 50, the cam hole 54 having a top end surface 56 and a bottom end surface 58, the top end surface 56 being in contact with a top end 62 of the actuating cam 60 and the bottom end surface 58 being in contact with a bottom end 64 of the actuating cam 60, the actuating cam 60 actuating vertically in the cam hole 54 of the lock gear 50.

The upper actuating member 30 and the lower supporting member 40 are securely fixed to each other by means of the lock gear 50, and the lock gear is actuated in the lock gear guiding groove 32 of the upper actuating member 30 and the lock gear actuating groove 42 of the lower supporting member 40. Consequently, twisting from side to side is reduced as compared to other conventional recliners even when any impact is applied to the recliner as the vehicle collides with another vehicle from the front or from behind, and thus any breakage of the lock gear 50 is prevented. Since the lock gear 50 and the actuating cam 60 are operated only by means of a shaft 70 in the lower supporting member 40, however, there is a clearance between the lock gear 50 and the actuating cam 60, which causes noise and vibration.

Furthermore, an outer gear part 52 is engaged with the inner gear part 45 of the lower supporting member 40 as well as the inner gear part 34 of the upper actuating member 30. Consequently, the assembly operation of the recliner is very difficult, and the engagement of the gear parts may be irregular, which also causes noise and vibration.

Moreover, when the recliner is loaded in front thereof or in the rear thereof, not only twisting of the recliner from side to side occurs but also shaking of the recliner occurs, whereby the load is not evenly applied to the outer gear part 52 of the lock gear 50. Consequently, a degree of strength of the recliner may be decreased, and the recliner may be easily damaged even by a light impact.

SUMMARY OF THE INVENTION

Therefore, the present invention has been made in view of the above problems, and it is an object of the present invention to provide a round recliner for a vehicle, comprising three lock gears evenly spaced apart from each other, each of the lock gears being interposed between a cam and a corresponding lock gear supporting member in such a manner that the lock gears are engaged with a circular inner gear part of a sector gear, thereby minimizing occurrence of clearances in the recliner and preventing any irregular engagement of the recliner.

It is another object of the present invention to provide a round recliner for a vehicle, comprising three lock gears, to each of which an external force is applied at a right angle thereto in such a manner that the external force is dispersed at three points, respectively, for evenly distributing the force to inner gear parts of the lock gears so that the strength of each of the inner gear parts of the lock gears is increased, and thus the strength of the recliner is also increased.

In accordance with the present invention, the above and other objects can be accomplished by the provision of a round recliner mounted in a seat of a vehicle for controlling an angle of inclination of the back of the seat, the recliner comprising: a sector gear including a circular shaft hole formed so that a rotating shaft is inserted therethrough, a circular inner gear part engaged with outer gear parts of lock gears, a back connection part having a plurality of connection protrusions for connecting the back connection part to the back of the seat, the connection protrusions being spaced a uniform angular distance from each other and also spaced a uniform radial distance from the circular shaft hole, and a lock gear receiving part formed at the inner surface of the sector gear for receiving three lock gears and an actuating cam; a holder combined with the sector gear, the holder including a cam receiving part for receiving connection protrusions of the actuating cam, three lock gear supporting members for supporting the three lock gears, respectively, so that the lock gears are locked or released, a seat connection part having first three connection protrusions and second three connection protrusions for connecting the seat connection part to the seat, each of the first connection protrusions having a diameter different from each of the second connection protrusions, the first connection protrusions being spaced a uniform angular distance from each other and also spaced a uniform radial distance from the center of the seat connection part, the second connection protrusions being spaced a uniform angular distance from each other and also spaced a uniform radial distance from the center of the seat connection part, the first and second connection protrusions being alternately arranged, and a lock gear receiving part formed at the inner surface of the holder for receiving the lock gears; the actuating cam disposed between the sector gear and the cam receiving part of the holder for locking the lock gears in the sector gear or releasing the lock gears from the sector gear by rotation of the rotating shaft; the three lock gears engaged with the inner gear part of the sector gear so that the lock gears are locked or released; a return spring for maintaining the locked state of the actuating cam, i.e., the engagement of the lock gears with the sector gear; and a fixing holder for preventing separation of the assembled sector gear and holder from each other.

Preferably, each of the lock gear supporting members includes: first and second sliding supporting surfaces for supporting each of the lock gears so that each of the lock gears is slidably moved on the first and second sliding supporting surfaces; a first blocking supporting surface for supporting each of the lock gears when the lock gears are locked; and a second blocking supporting surface for supporting each of the lock gears when the lock gears are released, and wherein the first and second sliding surfaces and the first blocking supporting surface are formed in the shape of circular arcs each having a rotating point as its center.

Preferably, a line extended from the center, i.e., the rotating point, of the first sliding supporting surface of each of the lock gear supporting members to the middle of the outer gear part of each of the lock gears is perpendicular to another line extended from a rotating point of each of the lock gears to the middle of the outer gear part of each of the lock gears.

Preferably, the cam receiving part of the holder is provided at the center thereof with a shaft hole, the rotating shaft being inserted through the shaft hole, and the cam receiving part of the holder is provided at the circumference thereof with a spring fixing groove for fixing an outer end of the return spring.

Preferably, the actuating cam includes: a rotating shaft insertion hole formed so that a polygonal end of the rotating shaft is inserted therethrough, and so that the actuating cam is rotated together with the rotating shaft; the connection protrusions inserted in the cam receiving part of the cam; a spring fixing groove for fixing an inner end of the return spring; lock gear actuating protrudes for actuating locking protrudes and releasing protrudes of the lock gears, respectively, so that the lock gears are locked in the sector gear or released from the sector gear; and lock gear fixing protrudes for pressing against the locking protrudes of the lock gears, respectively, so that the lock gears are completely fixed to the sector gear.

Preferably, the lock gear actuating protrudes and the lock gear fixing protrudes are formed in the shape of steps, respectively, so that the lock gear actuating protrudes and the lock gear fixing protrudes make contact with the lock gears and are separated from the lock gears by means of two step-like point contacts in a step fashion when the lock gears are locked or released.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
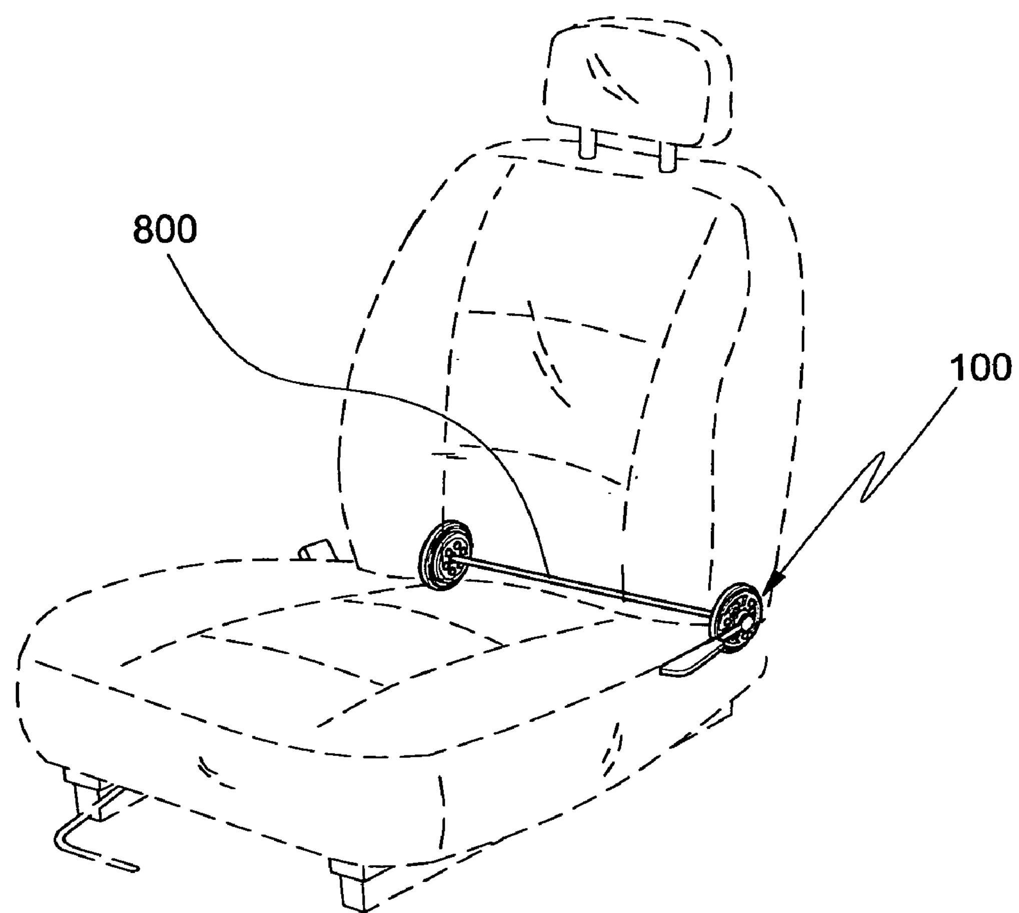
FIG. 1 is a perspective view of a seat of a vehicle in which a round recliner according to the present invention is mounted.
Figure 2:
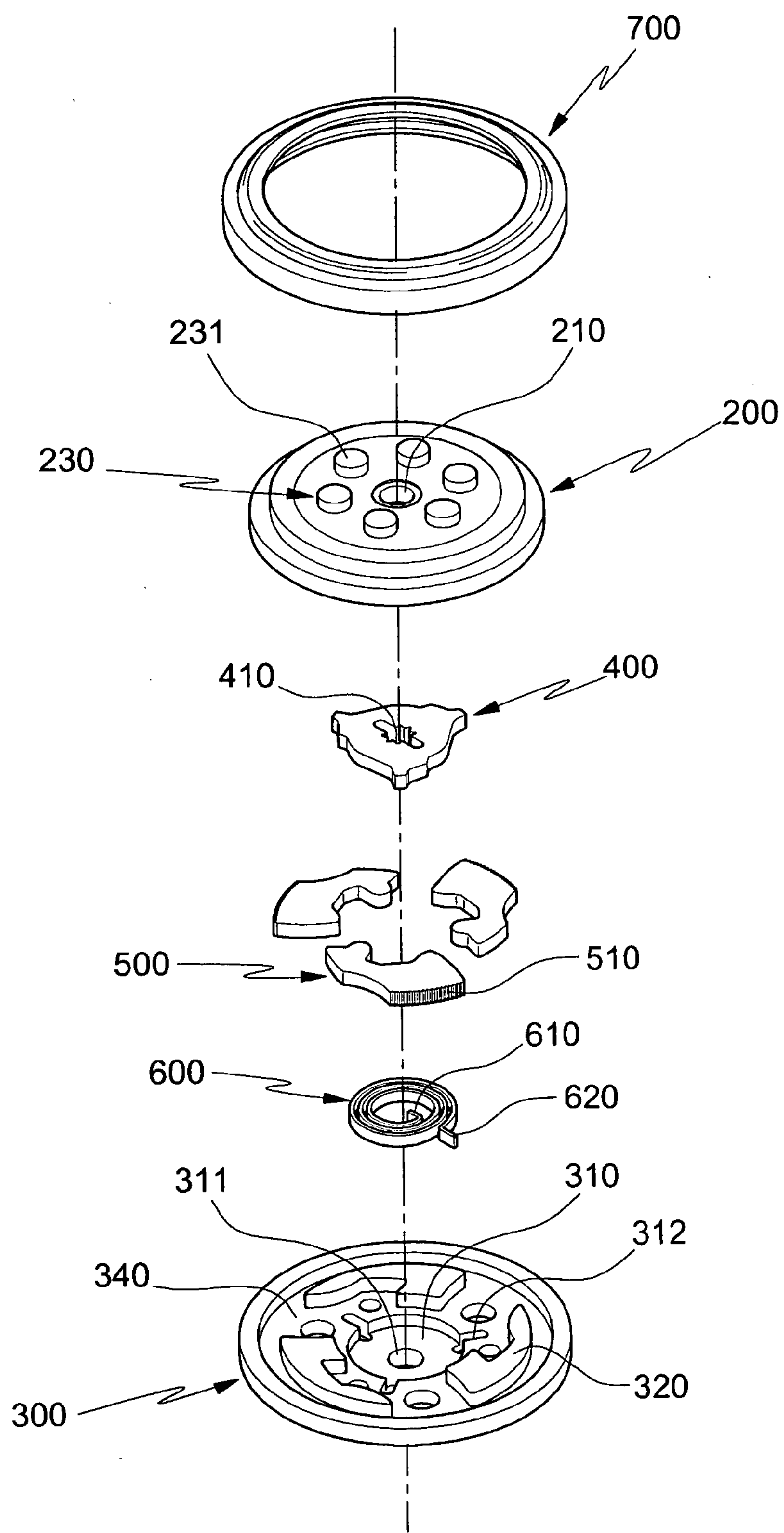
FIG. 2 is an exploded perspective view of the round recliner according to the present invention.
Figure 3A:
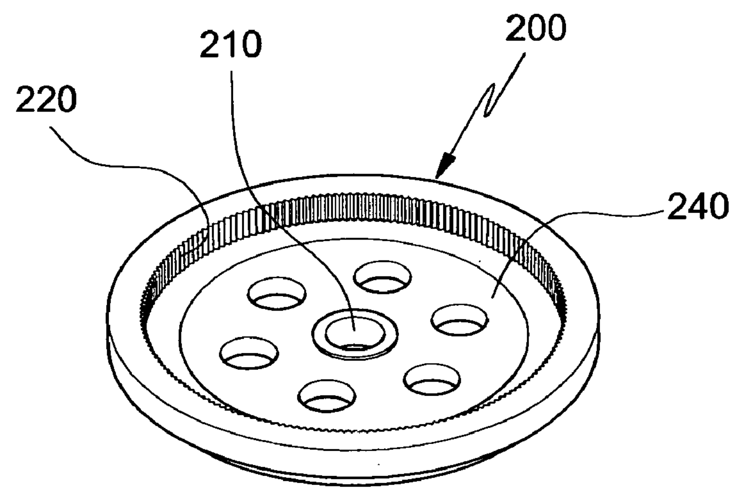
FIGS. 3*a* to 3*d* are detail views of components of the round recliner according to the present invention.
Figure 3B:
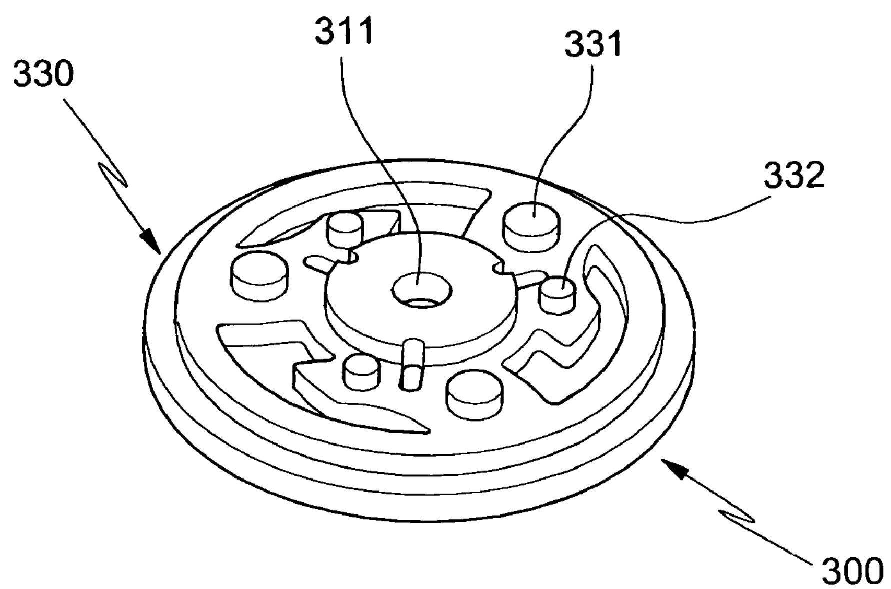
Figure 3C:
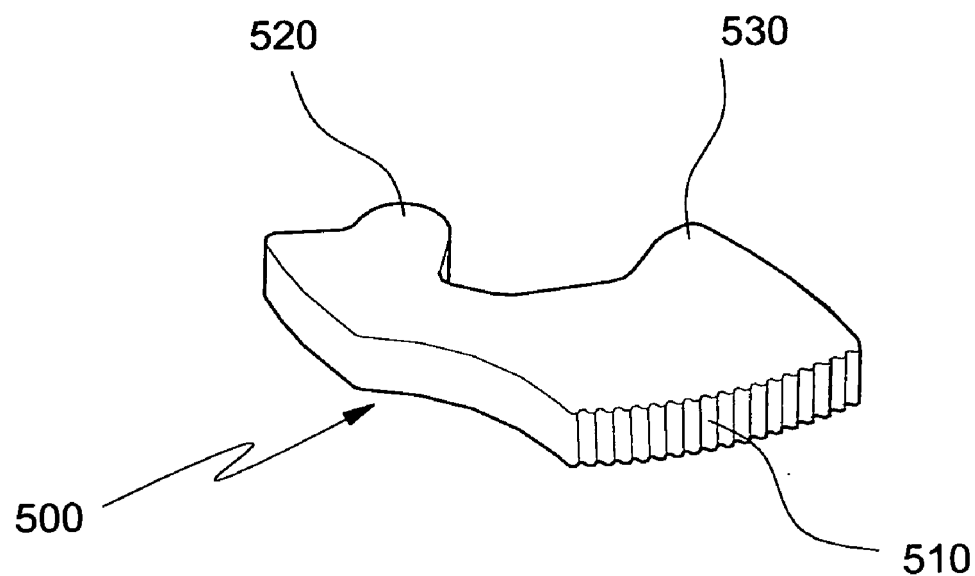
Figure 3D:
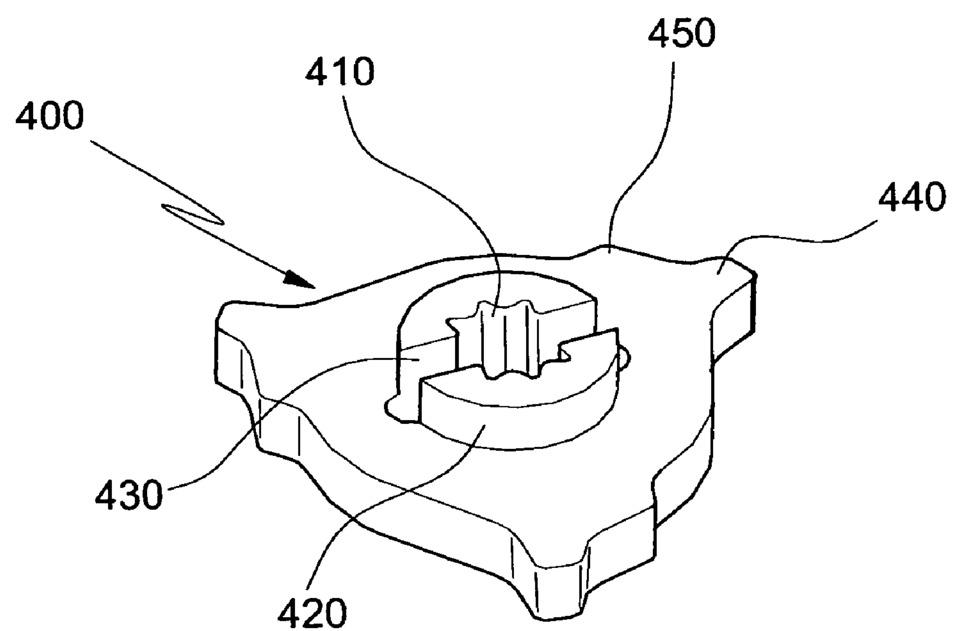

FIG. 1 is a perspective view of a seat of a vehicle in which a round recliner according to the present invention is mounted, FIG. 2 is an exploded perspective view of the round recliner according to the present invention, and FIGS. 3*a* to 3*d* are detail views of components of the round recliner according to the present invention.

A round recliner 100 of the present invention is generally mounted in an existing car seat, as shown in FIG. 1. The back of the car seat is normally in a locked state. When an angle of inclination of the back of the car seat is to be controlled, a driver releases the locked state of the recliner 100 to control the angle of inclination of the back of the car seat, and then the driver locks again the recliner 100.

As shown in FIGS. 2 and 3*a* to 3*d*, the round recliner 100 of the present invention, which functions as mentioned above, comprises: a sector gear 200; a holder 300 combined with the sector gear 200; an actuating cam 400; three lock gears 500; a return spring 600; and a fixing holder 700.

The sector gear 200 includes a circular shaft hole 210, through which a rotating shaft 800 is inserted, a circular inner gear part 220 engaged with outer gear parts of lock gears, a back connection part 230 having a plurality of connection protrusions 231 formed thereon, by which the back connection part 230 is connected to the back of a seat, the connection protrusions 231 being spaced a uniform angular distance from each other and also spaced a uniform radial distance from the circular shaft hole 210, and a lock gear receiving part 240 formed at the inner surface of the sector gear 200 for receiving three lock gears 500 and an actuating cam 400.

The holder 300 includes a cam receiving part 310 for receiving connection protrusions 420 of the actuating cam 400, three lock gear supporting members 320 for supporting the three lock gears 500, respectively, in such a manner that the lock gears 500 are locked or released, a seat connection part 330 having first three connection protrusions 331 and second three connection protrusions 332 formed thereon, by which the seat connection part 330 is connected to the seat, each of the first connection protrusions 331 having a diameter different from each of the second connection protrusions 332, the first connection protrusions 331 being spaced a uniform angular distance from each other and also spaced a uniform radial distance from the center of the seat connection part 330, the second connection protrusions 332 being spaced a uniform angular distance from each other and also spaced a uniform radial distance from the center of the seat connection part 330, the first and second connection protrusions 331 and 332 being alternately arranged, and a lock gear receiving part 340 formed at the inner surface of the holder 300 for receiving the lock gears 500.

The actuating cam 400 is disposed between the sector gear 200 and the cam receiving part 310 of the holder 300 for locking the lock gears 500 in the sector gear 200 or releasing the lock gears 500 from the sector gear 200 by rotation of the rotating shaft 800.

The three lock gears 500 are engaged with the inner gear part 220 of the sector gear 200 in such a manner that the lock gears 500 are locked or released.

The return spring 600 is provided for maintaining the locked state of the actuating cam, i.e., the engagement of the lock gears 500 with the sector gear 200.

The fixing holder 700 is provided for preventing separation of the assembled sector gear 200 and holder 300 from each other.

The cam receiving part 310 of the holder 300 is provided at the center thereof with a shaft hole 311, through which the rotating shaft 800 is inserted. The cam receiving part 310 of the holder 300 is provided at the circumference thereof with a spring fixing groove 312 for fixing an outer end 620 of the return spring 600.

Each of the lock gear supporting members 320 includes: first and second sliding supporting surfaces 321 and 322 for supporting each of the lock gears 500 in such a manner that each of the lock gears 500 is slidably moved on the first and second sliding supporting surfaces 321 and 322; a first blocking supporting surface 323 for supporting each of the lock gears 500 when the lock gears 500 are locked; and a second blocking supporting surface 324 for supporting each of the lock gears 500 when the lock gears 500 are released. The first and second sliding surfaces 321 and 322 and the first blocking supporting surface 323 are formed in the shape of circular arcs each having a rotating point A as its center (Refer to FIG. 7). Consequently, occurrence of clearances in the recliner is minimized, and thus the quality of the recliner is improved.

Figure 7:
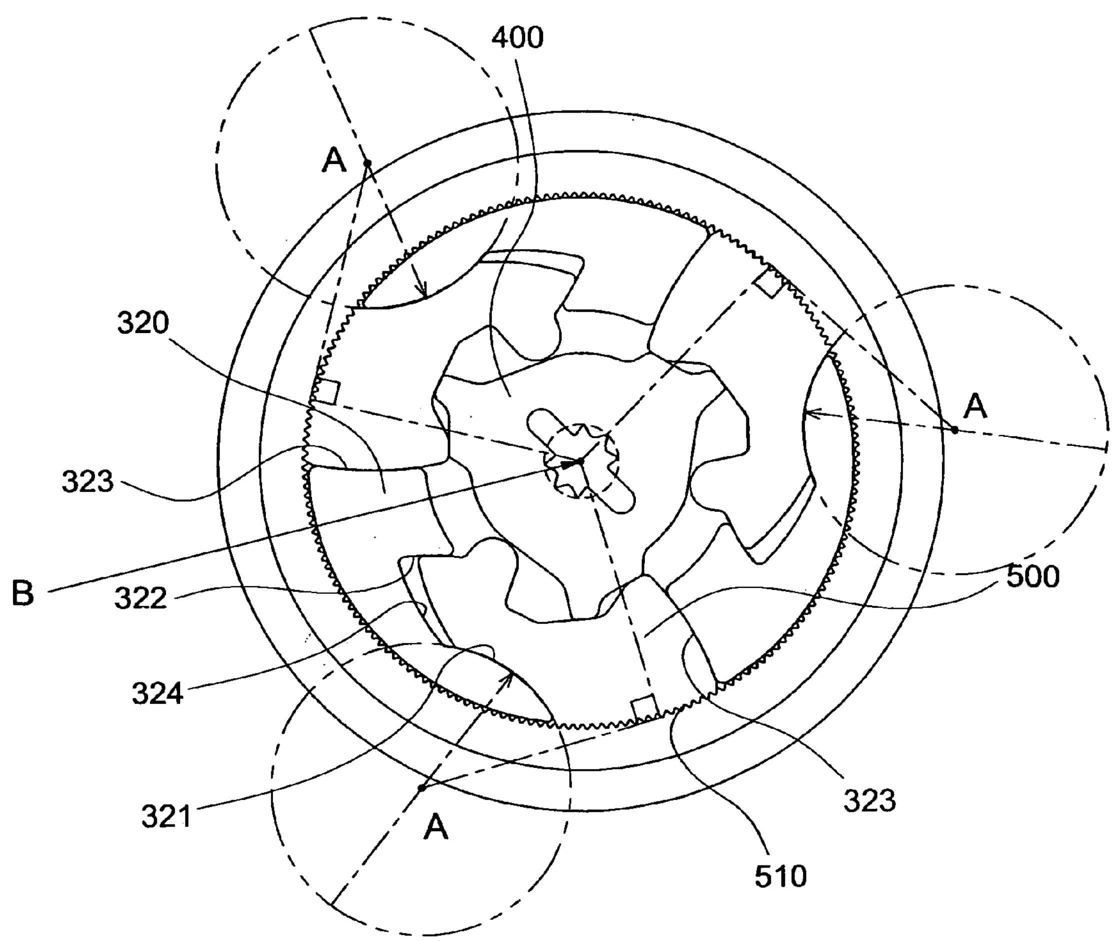
FIG. 7 is a plan view of the round recliner according to the present invention illustrating the operation of the recliner.
Figure 8:
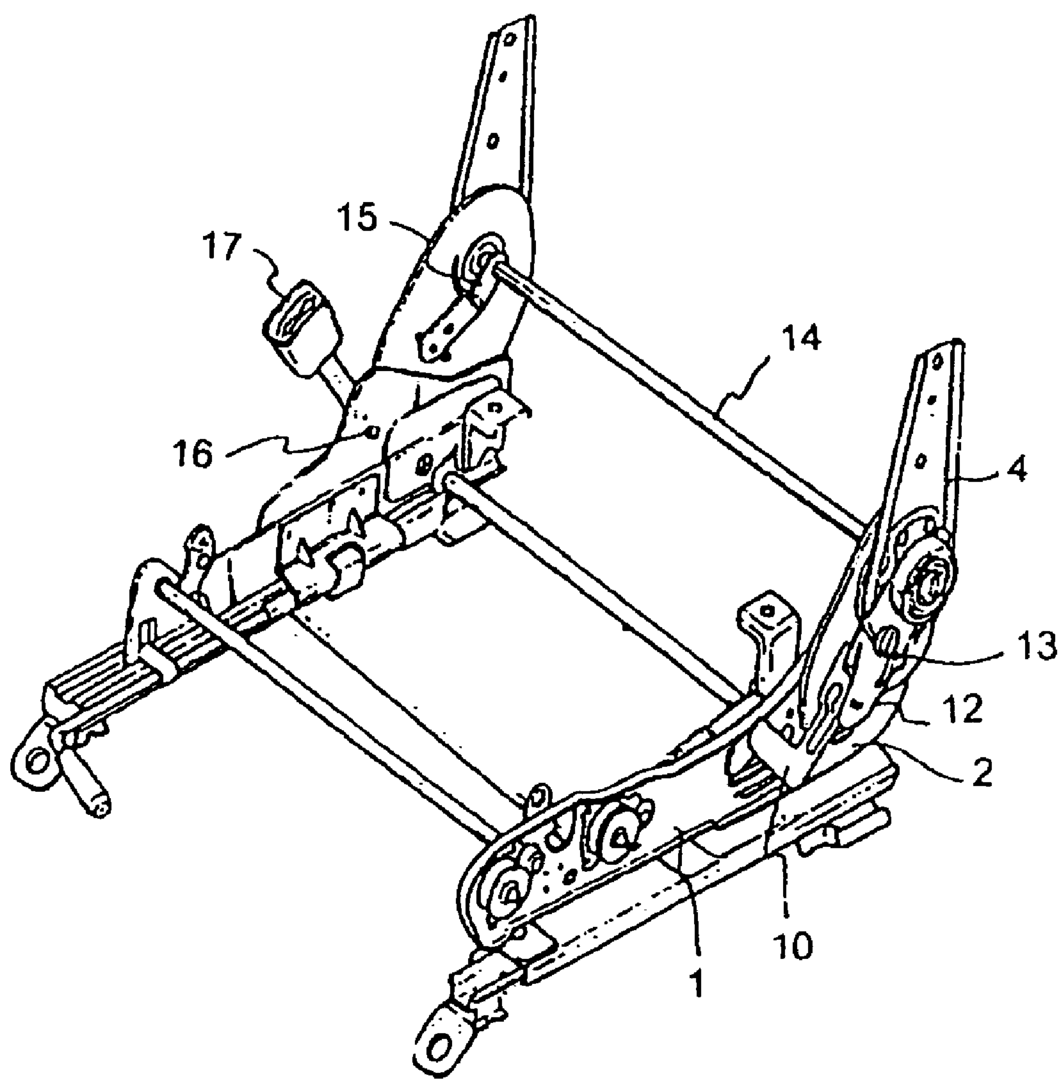
FIG. 8 is a perspective view of a conventional recliner showing a shaft connected between two opposite links of the recliner.
Figure 9:
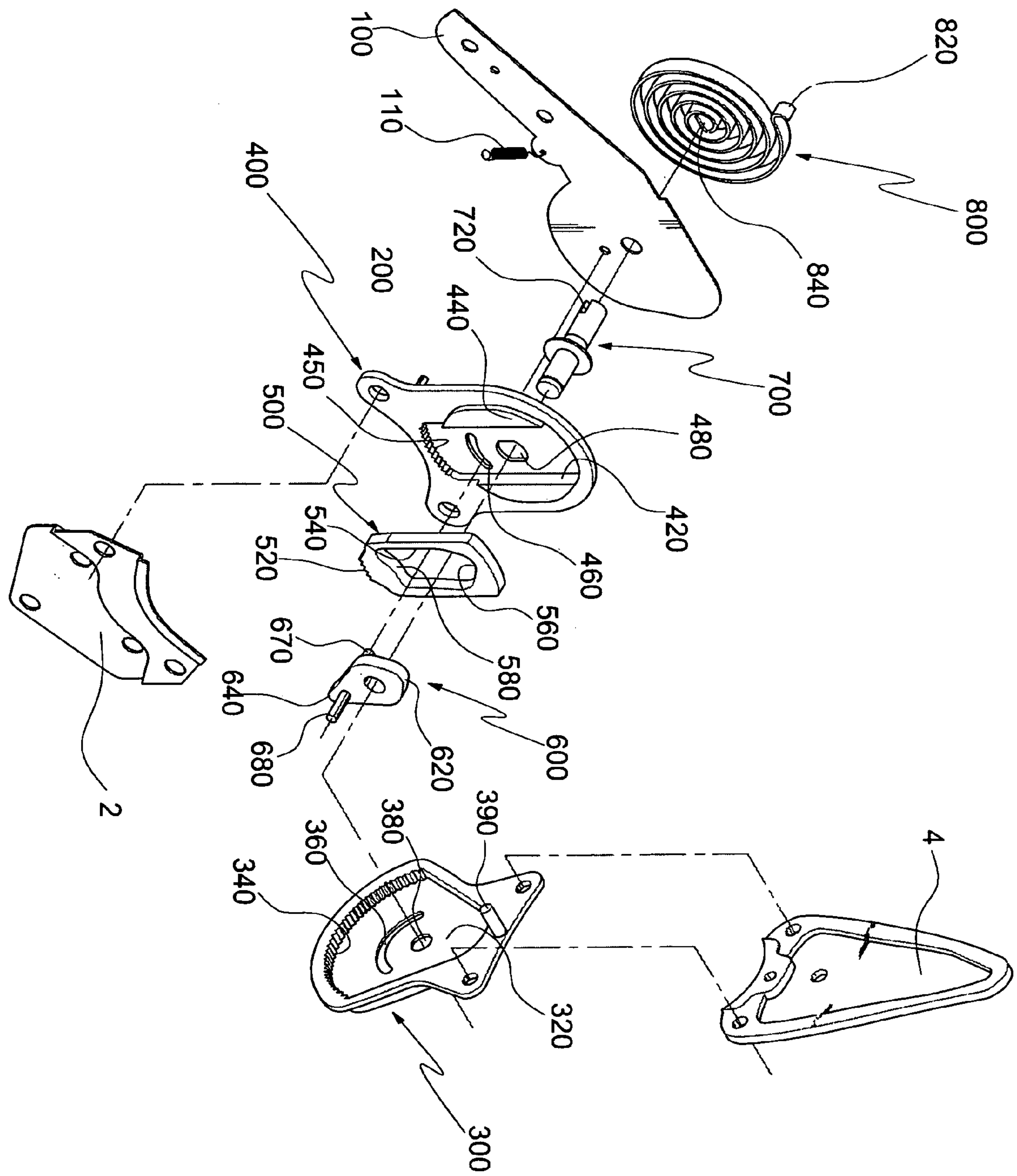
FIG. 9 is an exploded perspective view of another conventional recliner.
Figure 10:
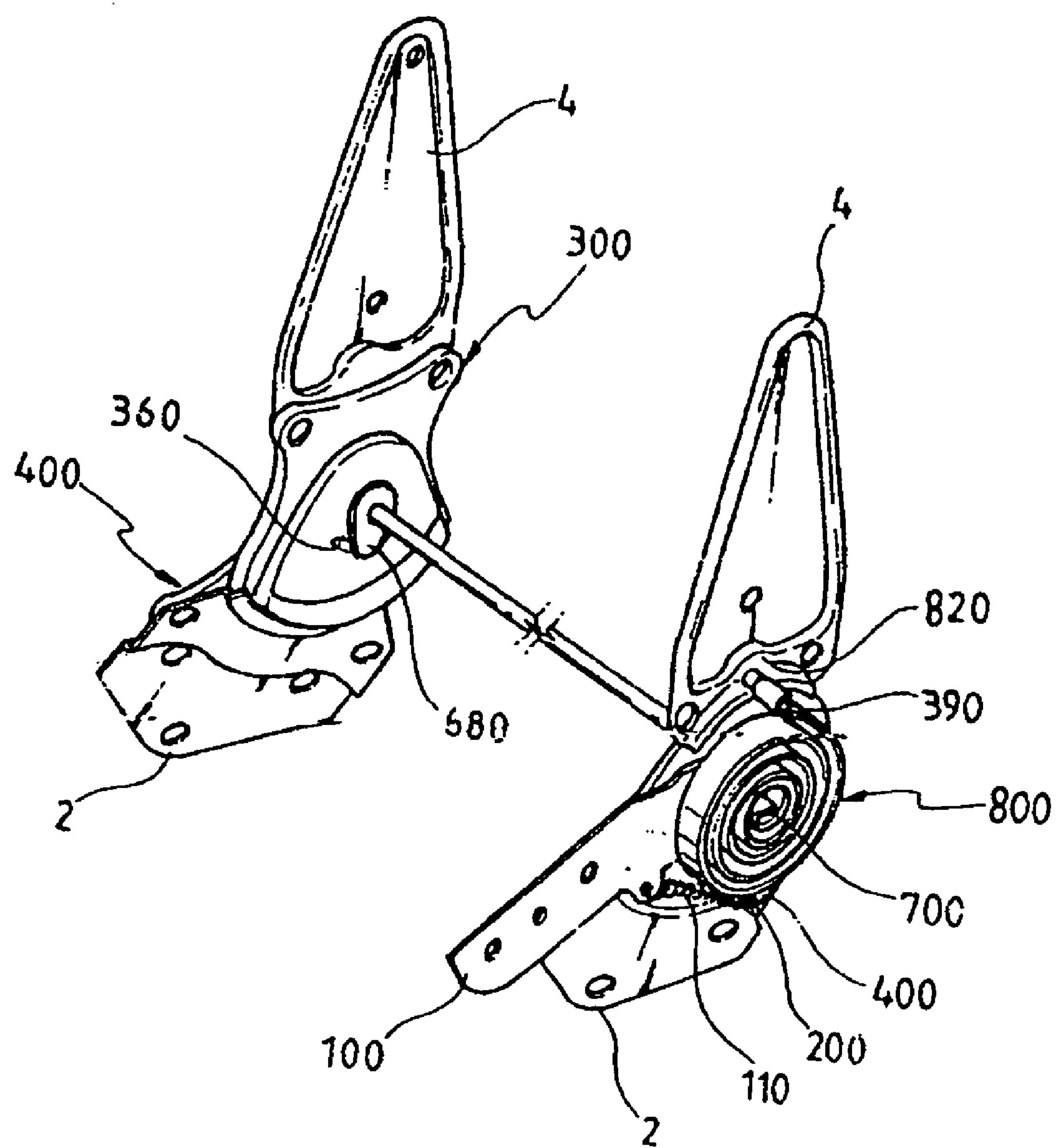
FIG. 10 is an assembled perspective view of the recliner of FIG. 9.

A line extended from the center, i.e., the rotating point A, of the first sliding supporting surface 321 of each of the lock gear supporting members 320 to the middle of the outer gear part 510 of each of the lock gears 500 is perpendicular to another line extended from a rotating point B of each of the lock gears 500 to the middle of the outer gear part 510 of each of the lock gears 500 (Refer to FIG. 7). Consequently, an external force is applied to each of the three lock gears 500 at a right angle thereto, and the external forces are dispersed at three points, respectively. When the external forces are applied to the three lock gears 500 at right angles thereto at the three points, respectively, the forces are evenly distributed to inner gear parts of the lock gears so that the strength of each of the inner gear parts of the lock gears is increased, and thus the strength of the recliner is also increased.

The actuating cam 400 includes: a rotating shaft insertion hole 410, through which a polygonal end of the rotating shaft 800 is inserted so that the actuating cam 400 is rotated together with the rotating shaft 800; the connection protrusions 420 inserted in the cam receiving part 310 of the cam 300; a spring fixing groove 430 for fixing an inner end 610 of the return spring 600; lock gear actuating protrudes 440 for actuating locking protrudes 530 and releasing protrudes 520 of the lock gears 500, respectively, so that the lock gears 500 are locked in the sector gear 200 or released from the sector gear 200; and lock gear fixing protrudes 450 for pressing against the locking protrudes 530 of the lock gears 500, respectively, so that the lock gears 500 are completely fixed to the sector gear 200.

The lock gear actuating protrudes 440 and the lock gear fixing protrudes 450 are formed in the shape of steps, respectively, so that the lock gear actuating protrudes 440 and the lock gear fixing protrudes 450 make contact with the lock gears 500 and are separated from the lock gears 500 in a step fashion when the lock gears 500 are locked or released. In other words, the actuating cam 400 makes contact with the lock gears 500 and are separated from the lock gears 500 by means of two step-like point contacts a and b, whereby concentration of stress is prevented, and the shape strength of each of the actuating cam 400 and the lock gears 500 is increased (Refer to FIG. 6*a*).

Each of the lock gears 500 includes: the outer gear part 510 having the same gear size as the inner gear part 220 of the sector gear 200; the releasing protrude 520; and the locking protrude 530.

When the lock gears 500 are turned along the lock gear supporting members 320 of the holder 300 so that the lock gears 500 are close to the lock gear supporting members 320 of the holder 300, respectively, the outer gear part 510 of each of the lock gears 500 is disengaged from the inner gear part 220 of the sector gear 200. Consequently, the lock gears 500 are released. When the lock gears 500 are turned back along the lock gear supporting members 320 of the holder 300 so that the lock gears 500 are far from the lock gear supporting members 320 of the holder 300, respectively, the outer gear part 510 of each of the lock gears 500 is engaged with the inner gear part 220 of the sector gear 200. Consequently, the lock gears 500 are locked.

The assembling process of the round recliner 100 with the afore-stated construction according to the present invention will now be described with reference to the accompanying drawings.

Figure 4:
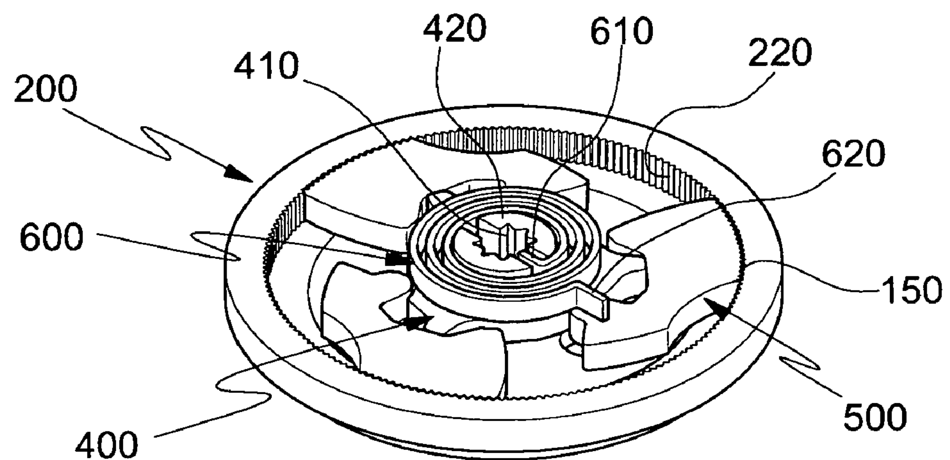
FIG. 4 is a partial cutaway view of the round recliner according to the present invention showing the assembled components of the round recliner according to the present invention.
Figure 5:
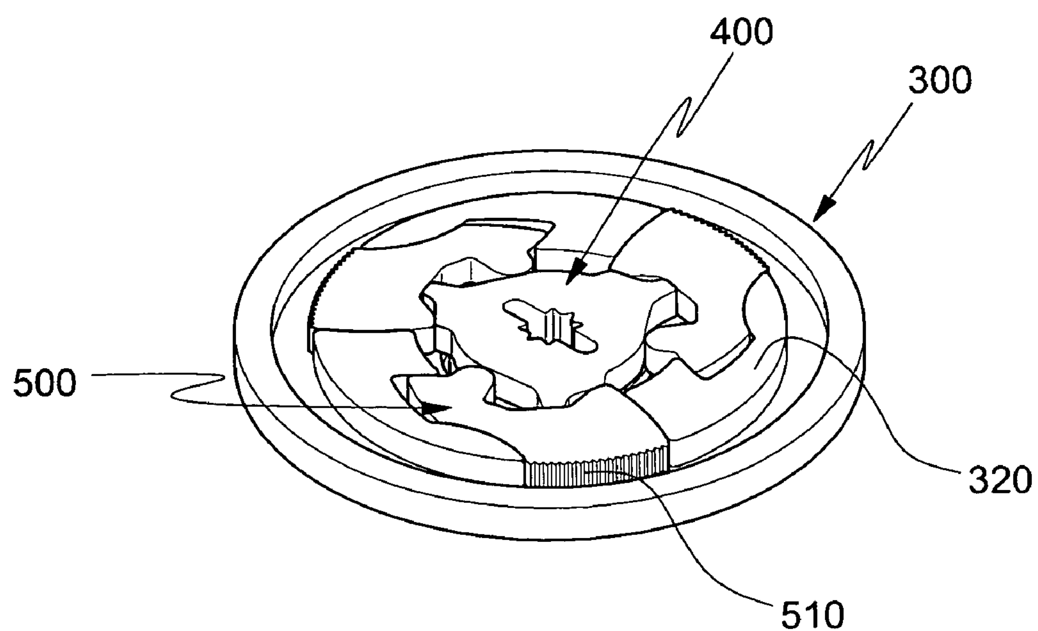
FIG. 5 is a bottom view of the round recliner according to the present invention shown in FIG. 4.

FIG. 4 is a partial cutaway view of the round recliner according to the present invention showing the assembled components of the round recliner according to the present invention, and FIG. 5 is a bottom view of the round recliner according to the present invention shown in FIG. 4. As shown in FIGS. 4 and 5, the return spring 600 is arranged around the connection protrusions 420 of the actuating cam 400. The inner end 610 of the return spring 600 is inserted into the spring fixing groove 430 of the actuating cam 400, and the outer end 620 of the return spring 600 is inserted into the spring fixing groove 312 of the holder 300. The connection protrusions 420 are disposed in the cam receiving part 310 of the holder 300. The rotating shaft 800 is inserted through the shaft hole 210 of the sector gear 200, the rotating shaft insertion hole 410 of the actuating cam 400, and the shaft hole 311 of the cam receiving part 310 of the holder 300, in order, so that the actuating cam is rotated with rotation of the rotating shaft 800. Each of the three lock gears 500 is disposed at each of the lock gear receiving parts 340 between one of the three lock gear supporting members 320 and the neighboring lock gear supporting member, and the sector gear 200 is attached to the holder 300. The fixing holder 700 is fitted on the assembled sector gear 200 and the holder 300, and then outer circumference of the fixing holder 700 is pressed by means of a press. In this way, the assembled recliner 100 is obtained.

The operation of the round recliner 100 with the afore-stated construction according to the present invention will now be described with reference to the accompanying drawings.

Figure 6A:
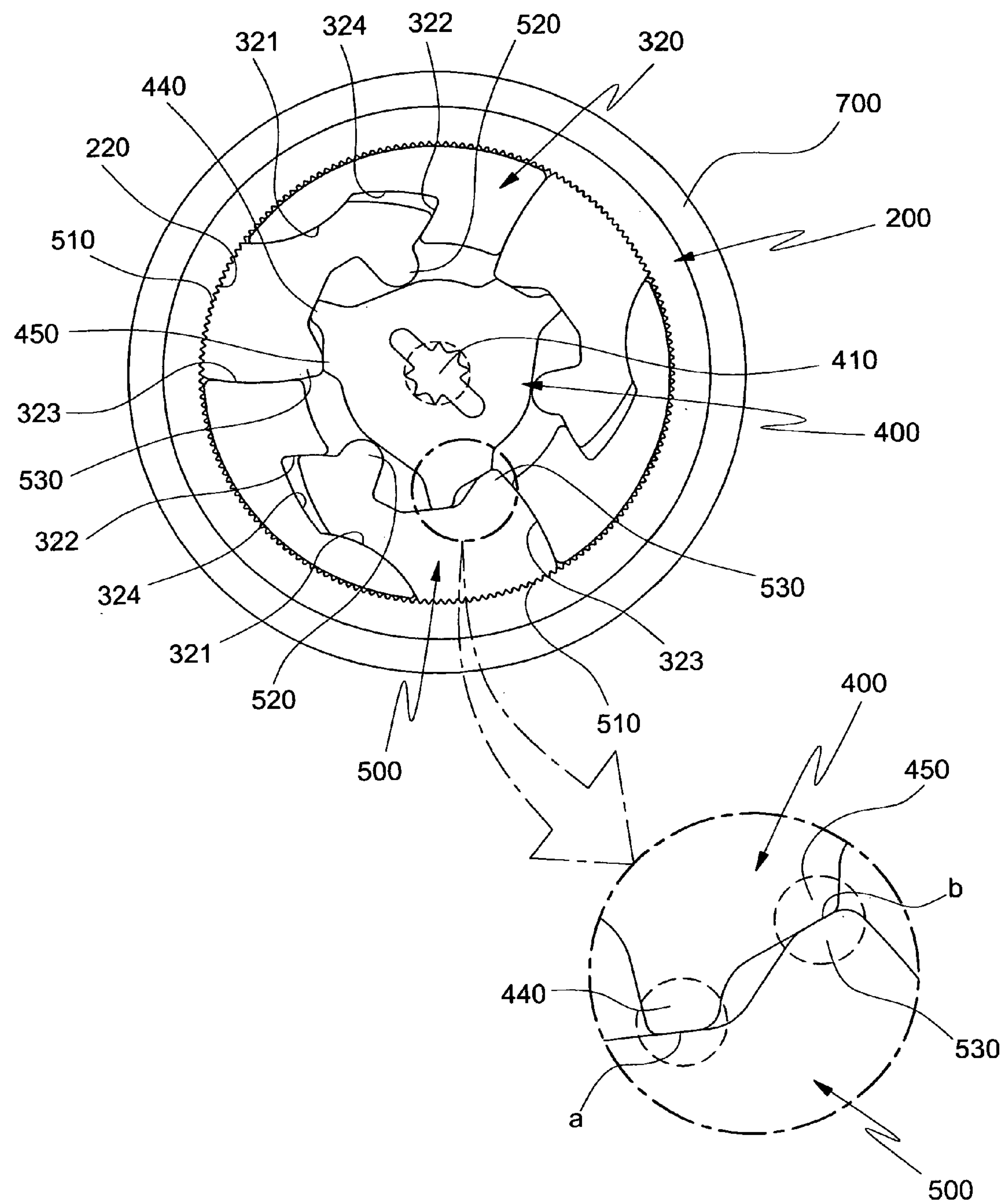
FIG. 6*a* is a plan view showing the round recliner according to the present invention in a locked state.
Figure 6B:
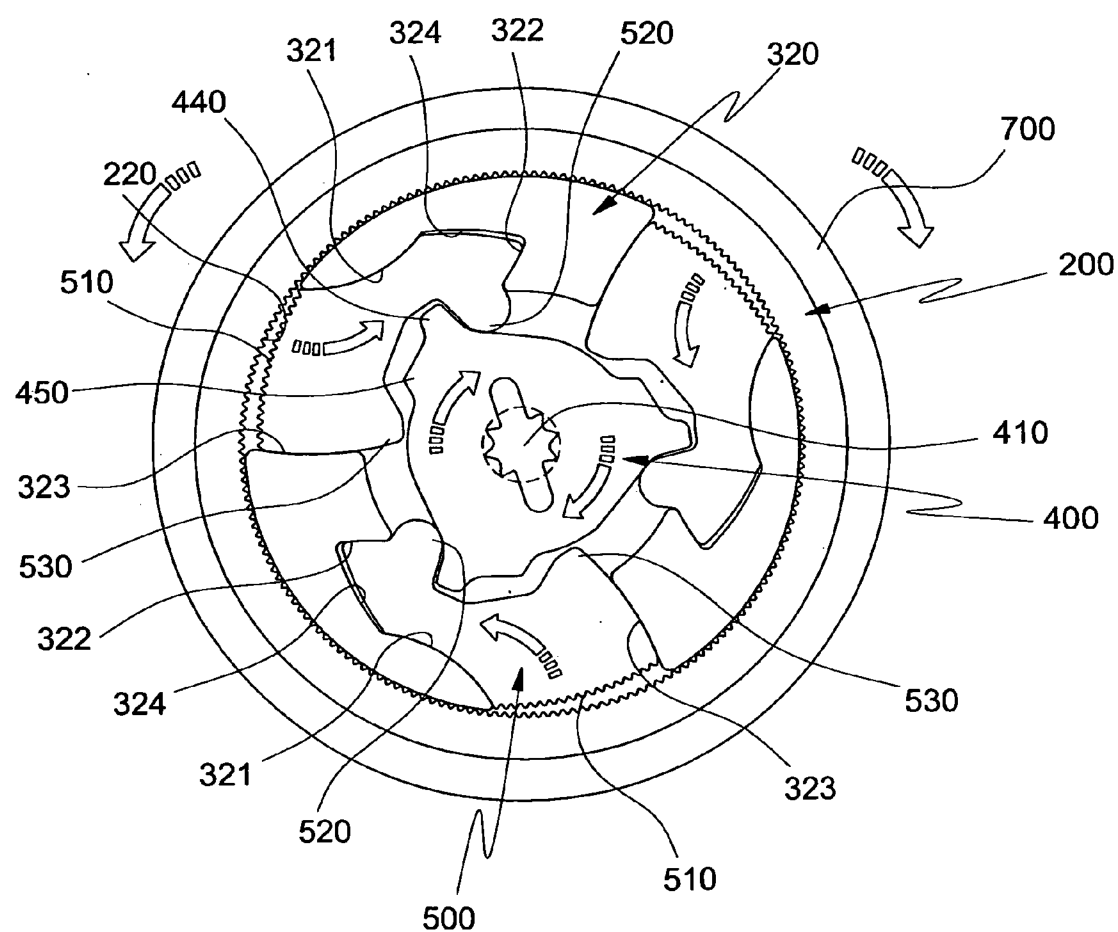
FIG. 6*b* is a plan view showing the round recliner according to the present invention when its locked state is released.

FIG. 6*a* is a plan view showing the round recliner according to the present invention in a locked state, and FIG. 6*b* is a plan view showing the round recliner according to the present invention when its locked state is released. The recliner 100 of the present invention is locked as shown in FIG. 6*a*. When the rotating shaft 800 is rotated clockwise, the actuating cam 400 is also rotated clockwise. At this time, the lock gear actuating protrudes 440 of the actuating cam 400 push up the releasing protrudes 520 of the lock gears 500, as shown in FIG. 6*b*, whereby the lock gears 500 are turned along the second sliding supporting surfaces 322 of the lock gear supporting members 320 of the holder 300 to make contact with the second blocking supporting surfaces 324, respectively. Consequently, the outer gear part 510 of each of the lock gears 500 is disengaged from the inner gear part 220 of the sector gear 200, and thus the lock gears 500 are released. At this time, the return spring 600 inwardly shrinks to retain a restoring force. Consequently, the rotating shaft 800 must be held in order to keep the recliner 100 of the present invention released.

When the rotating shaft 800 is released to lock the recliner 100 of the present invention, the rotating shaft 800 is rotated counterclockwise by means of the restoring force of the return spring 600. As a result, the actuating cam 400 is also rotated counterclockwise, and returned to the initial position. At this time, the lock gear actuating protrudes 440 of the actuating cam 400 push up the locking protrudes 530 of the lock gears 500, as shown in FIG. 6*a*, whereby the lock gears 500 are turned back along the first and second sliding supporting surfaces 321 and 322 of the lock gear supporting members 320 of the holder 300 to make contact with the first blocking supporting surfaces 323, respectively, so that the lock gear fixing protrudes 450 is strongly pressed against the locking protrudes 530 of the lock gears 500. Consequently, the outer gear part 510 of each of the lock gears 500 is engaged with the inner gear part 220 of the sector gear 200, and thus the lock gears 500 are locked. At this time, the actuating cam 400 is no longer moved by means of the return spring 600, whereby the engagement of the lock gears 500 with the sector gear 200 is stably maintained.

In brief, the lock gears 500 are turned along the lock gear supporting members 320 of the holder 300 so that the lock gears 500 are close to the lock gear supporting members 320 of the holder 300, respectively. As a result, the outer gear part 510 of each of the lock gears 500 is disengaged from the inner gear part 220 of the sector gear 200. Consequently, the lock gears 500 are released. When the lock gears 500 are turned back along the lock gear supporting members 320 of the holder 300 so that the lock gears 500 are far from the lock gear supporting members 320 of the holder 300, respectively, the outer gear part 510 of each of the lock gears 500 is engaged with the inner gear part 220 of the sector gear 200. Consequently, the lock gears 500 are locked.

The lock gears 500 of the present invention are turned along the supporting surfaces 321, 322 and 323 formed at the lock gear supporting members 320 of the holder 300, whereby clearances between the lock gears 500 and the lock gear supporting members 320 of the holder 300 do not occur, and thus the strength of the recliner of the present invention is increased.

As apparent from the above description, the present invention provides a round recliner for a vehicle, comprising three lock gears evenly spaced apart from each other, each of the lock gears being interposed between a cam and a corresponding lock gear supporting member in such a manner that the lock gears are engaged with a circular inner gear part of a sector gear, wherein the lock gears are turned along the lock gear supporting members so that an outer gear part of each of the lock gears is disengaged from the inner gear part of the sector gear or the outer gear part of each of the lock gears is engaged with the inner gear part of the sector gear, thereby minimizing occurrence of clearances in the recliner and preventing any irregular engagement of the recliner.

Furthermore, a line extended from a rotating point of a first sliding supporting surface of each of the lock gear supporting members to the middle of the outer gear part of each of the lock gears is perpendicular to another line extended from a rotating point of each of the lock gears to the middle of the outer gear part of each of the lock gears, whereby an external force is applied to each of the three lock gears at a right angle thereto, and the external forces are dispersed at three points, respectively. Consequently, the forces are evenly distributed to inner gear parts of the lock gears so that the strength of each of the inner gear parts of the lock gears is increased, and thus the strength of the recliner is also increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A round recliner mounted in a seat of a vehicle for controlling an angle of inclination of the back of the seat, the recliner comprising:

a sector gear including a circular shaft hole formed so that a rotating shaft is inserted therethrough, a circular inner gear part engaged with outer gear parts of lock gears, a back connection part having a plurality of connection protrusions for connecting the back connection part to the back of the seat, the connection protrusions being spaced a uniform angular distance from each other and also spaced a uniform radial distance from the circular shaft hole, and a lock gear receiving part formed at the inner surface of the sector gear for receiving three lock gears and an actuating cam;

a holder combined with the sector gear, the holder including a cam receiving part for receiving connection protrusions of the actuating cam, three lock gear supporting members for supporting the three lock gears, respectively, so that the lock gears are locked or released, a seat connection part having first three connection protrusions and second three connection protrusions for connecting the seat connection part to the seat, each of the first connection protrusions having a diameter different from each of the second connection protrusions, the first connection protrusions being spaced a uniform angular distance from each other and also spaced a uniform radial distance from the center of the seat connection part, the second connection protrusions being spaced a uniform angular distance from each other and also spaced a uniform radial distance from the center of the seat connection part, the first and second connection protrusions being alternately arranged, and a lock gear receiving part formed at the inner surface of the holder for receiving the lock gears;

the actuating cam disposed between the sector gear and the cam receiving part of the holder for locking the lock gears in the sector gear or releasing the lock gears from the sector gear by rotation of the rotating shaft;

the three lock gears engaged with the inner gear part of the sector gear so that the lock gears are locked or released;

a return spring for maintaining the locked state of the actuating cam; and a fixing holder for preventing separation of the assembled sector gear and holder from each other.

2. The recliner as set forth in claim 1, wherein the cam receiving part of the holder is provided at the center thereof with a shaft hole, the rotating shaft being inserted through the shaft hole, and the cam receiving part of the holder is provided at the circumference thereof with a spring fixing groove for fixing an outer end of the return spring.

3. The recliner as set forth in claim 1, wherein each of the lock gear supporting members includes:

first and second sliding supporting surfaces for supporting each of the lock gears so that each of the lock gears is slidably moved on the first and second sliding supporting surfaces;

a first blocking supporting surface for supporting each of the lock gears when the lock gears are locked; and a second blocking supporting surface for supporting each of the lock gears when the lock gears are released, and wherein the first and second sliding surfaces and the first blocking supporting surface are formed in the shape of circular arcs each having a rotating point as its center.

4. The recliner as set forth in claim 3, wherein a line extended from the center of the first sliding supporting surface of each of the lock gear supporting members to the middle of the outer gear part of each of the lock gears is perpendicular to another line extended from a rotating point of each of the lock gears to the middle of the outer gear part of each of the lock gears.

5. The recliner as set forth in claim 1, wherein the actuating cam includes:

a rotating shaft insertion hole formed so that a polygonal end of the rotating shaft is inserted therethrough, and so that the actuating cam is rotated together with the rotating shaft;

the connection protrusions inserted in the cam receiving part of the cam;

a spring fixing groove for fixing an inner end of the return spring;

lock gear actuating protrudes for actuating locking protrudes and releasing protrudes of the lock gears, respectively, so that the lock gears are locked in the sector gear or released from the sector gear; and lock gear fixing protrudes for pressing against the locking protrudes of the lock gears, respectively, so that the lock gears are completely fixed to the sector gear.

6. The recliner as set forth in claim 5, wherein the lock gear actuating protrudes and the lock gear fixing protrudes are formed in the shape of steps, respectively, so that the lock gear actuating protrudes and the lock gear fixing protrudes make contact with the lock gears and are separated from the lock gears by means of two step-like point contacts in a step fashion when the lock gears are locked or released.

7. The recliner as set forth in claim 1, wherein each of the lock gears includes: the outer gear part having the same gear size as the inner gear part of the sector gear; the releasing protrude; and the locking protrude.

* * * * *

US006908156C1

(12) EX PARTE REEXAMINATION CERTIFICATE (9727th)

United States Patent

(10) Number: US 6,908,156 C1
(45) Certificate Issued: Jun. 27, 2013

Park et al.

(54) ROUND RECLINER FOR VEHICLE

(75) Inventors: Myung Won Park, Seoul (KR); Seong Tae Kim, Cheonan-Si (KR)

(73) Assignee: Austem Co., Ltd., Jangsan-Ri, Susin-Myeon, Chungeheongnam-Do, Cheonan-Si (KR)

Reexamination Request:
No. 90/012,263, Apr. 24, 2012

Reexamination Certificate for:

| | |
|---|---|
| Patent No.: | **6,908,156** |
| Issued: | **Jun. 21, 2005** |
| Appl. No.: | **10/735,034** |
| Filed: | **Dec. 12, 2003** |

(30) Foreign Application Priority Data

Feb. 18, 2003 (KR) ........................ 10-2003-0010060

(51) Int. Cl.
*B60N 2/02* (2006.01)

(52) U.S. Cl.
USPC ....................................... 297/366; 297/367 R

(58) Field of Classification Search
None
See application file for complete search history.

(56) References Cited

To view the complete listing of prior art documents cited during the proceeding for Reexamination Control Number 90/012,263, please refer to the USPTO's public Patent Application Information Retrieval (PAIR) system under the Display References tab.

*Primary Examiner* — Glenn K. Dawson

(57) ABSTRACT

A round recliner for a vehicle having three lock gears evenly spaced apart from each other. Each of the lock gears are interposed between a cam and a corresponding lock gear supporting member in such a manner that the lock gears are engaged with a circular inner gear part of a sector gear, wherein the lock gears are turned along the lock gear supporting members so that an outer gear part of each of the lock gears is disengaged from the inner gear part of the sector gear or the outer gear part of each of the lock gears is engaged with the inner gear part of the sector gear, thereby minimizing occurrence of clearances in the recliner and preventing any irregular engagement of the recliner.

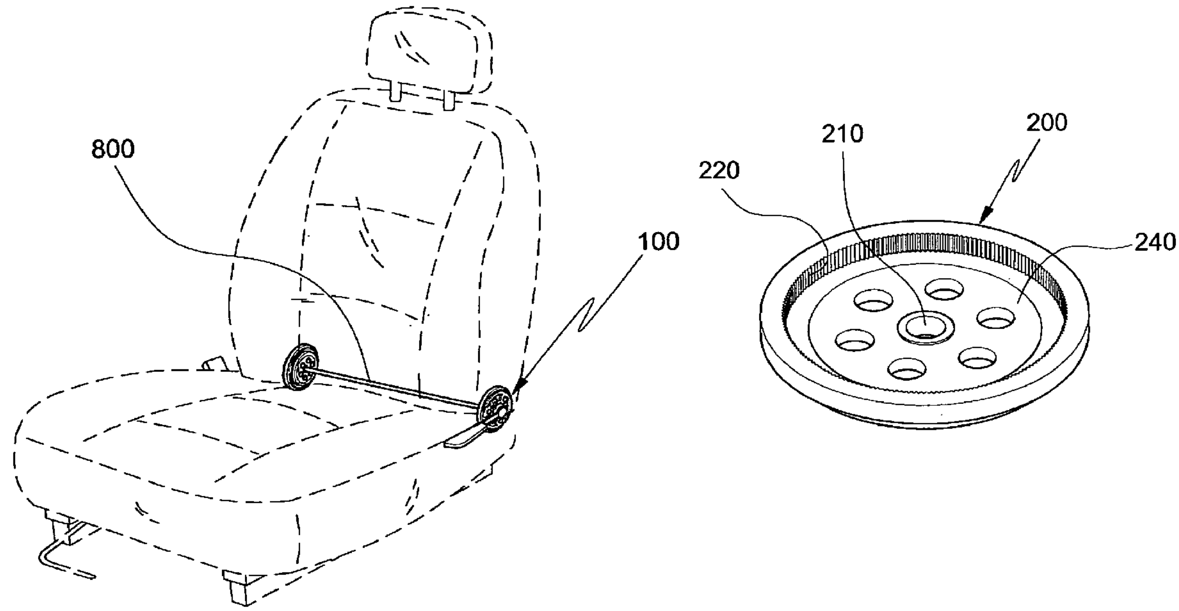

Amended
FIG. 7
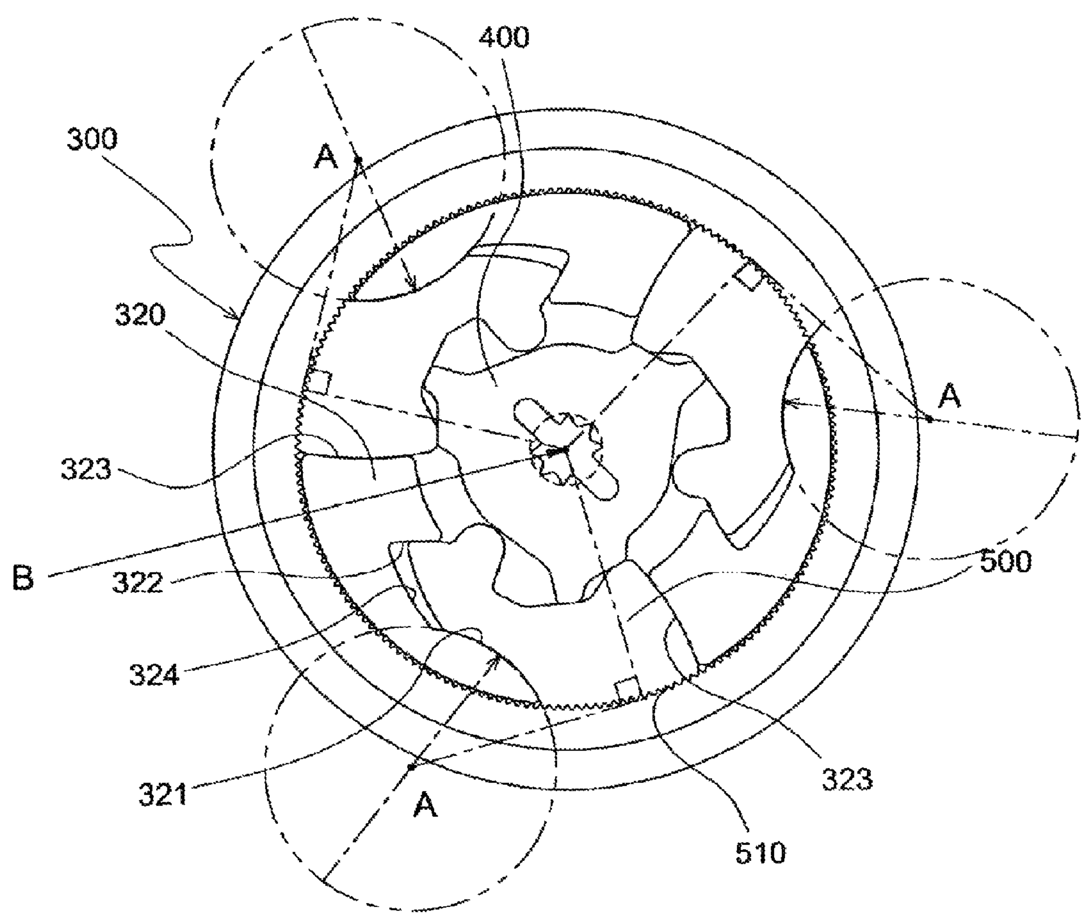

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 5, line 58- column 6, line 5:

Each of the lock gear supporting members 320 includes: first and second sliding supporting surfaces 321 and 322 for supporting each of the lock gears 500 in such a manner that each of the lock gears 500 is slidably moved on the first and second sliding supporting surfaces 321 and 322; a first blocking supporting surface 323 for supporting each of the lock gears 500 when the lock gears 500 are locked; and a second blocking supporting surface 324 for supporting each of the lock gears 500 when the lock gears 500 are released. The first and second sliding surfaces 321 and 322 *of one lock gear supporting member* and the first blocking supporting surface 323 *of an adjacent lock gear supporting member* are formed in the shape of circular arcs each having a rotating point A as its center (Refer to FIG. 7). Consequently, occurrence of clearances in the recliner is minimized, and thus the quality of the recliner is improved. *Also, the rotating point A is at an outside of the holder 300.*

THE DRAWING FIGURES HAVE BEEN CHANGED AS FOLLOWS:

Reference 300 has been added to FIG. 7.

AS A RESULT OF REEXAMINATION, IT HAS BEEN DETERMINED THAT:

Claims 1 and 3 are determined to be patentable as amended.

Claims 2 and 4-7, dependent on an amended claim, are determined to be patentable.

1. A round recliner mounted in a seat of a vehicle for controlling an angle of inclination of the back of the seat, the recliner comprising:

a sector gear including a circular shaft hole formed so that a rotating shaft is inserted therethrough, a circular inner gear part engaged with outer gear parts of lock gears, a back connection part having a plurality of connection protrusions for connecting the back connection part to the back of the seat, the connection protrusions being spaced a uniform angular distance from each other and also spaced a uniform radial distance from the circular shaft hole, and a lock gear receiving part formed at the inner surface of the sector gear for receiving three lock gears and an actuating cam;

a holder combined with the sector gear, the holder including a cam receiving part for receiving connection protrusions of the actuating cam, three lock gear supporting members for supporting the three lock gears, respectively, so that the lock gears are locked or released, a seat connection part having first three connection protrusions and second three connection protrusions for connecting the seat connection part to the seat, each of the first connection protrusions having a diameter different from each of the second connection protrusions, the first connection protrusions being spaced a uniform angular distance from each other and also spaced a uniform radial distance from the center of the seat connection part, the second connection protrusions being spaced a uniform angular distance from each other and also spaced a uniform radial distance from the center of the seat connection part, the first and second connection protrusions being alternately arranged, and a lock gear receiving part formed at the inner surface of the holder for receiving the lock gears;

the actuating cam disposed between the sector gear and the cam receiving part of the holder for locking the lock gears in the sector gear or releasing the lock gears from the sector gear by rotation of the rotating shaft;

the three lock gears engaged with the inner gear part of the sector gear so that the lock gears are locked or released;

a return spring for maintaining the locked state of the actuating cam; [and]

a fixing holder for preventing separation of the assembled sector gear and holder from each other*; and*

*each of the lock gear supporting members including a first sliding supporting surface for supporting each of the lock gears so that each of the lock gears is slidably moved on the first sliding supporting surface, the first sliding supporting surface is formed in the shape of a circular arc having a rotating point as its center at an outside of the holder.*

3. The recliner as set forth in claim 1, wherein each of the lock gear supporting members includes:

[first and] *a* second sliding supporting [surfaces] *surface* for supporting each of the lock gears *together with the first sliding supporting surface* so that each of the lock gears is slidably moved on the first and second sliding supporting surfaces;

a first blocking supporting surface for supporting each of the lock gears when the lock gears are locked; and a second blocking supporting surface for supporting each of the lock gears when the lock gears are released, and wherein the [first and] second sliding *supporting* [surfaces] *surface* of *one lock gear supporting member* and the first blocking supporting surface *of an adjacent lock gear supporting member* are formed in the shape of circular arcs each having [a] *the same* rotating point *of the first sliding supporting surface of the one lock gear supporting member* as its center *at the outside of the holder*.

* * * * *